Aug. 11, 1936.    J. Y. BLAZEK ET AL    2,050,481
LENGTH ADJUSTING MEANS FOR PLUNGERS AND THE LIKE
Filed March 13, 1933    2 Sheets-Sheet 2
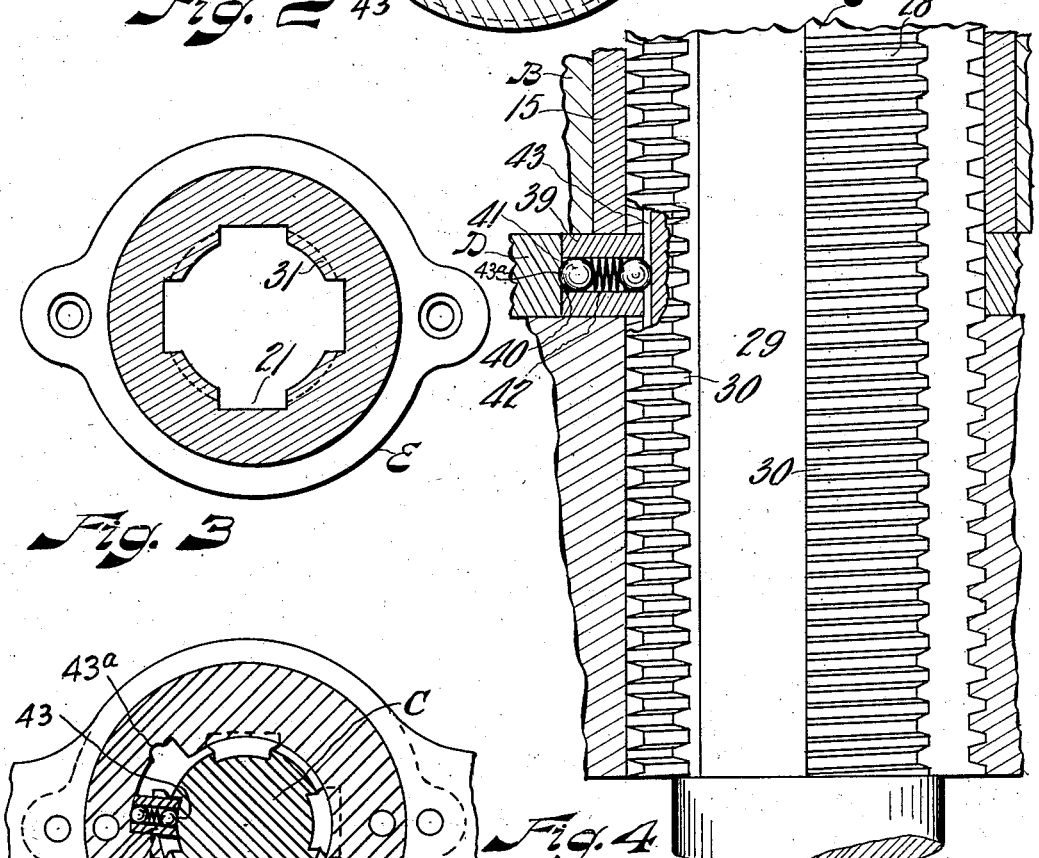
INVENTORS
J. Y. Blazek
and
R. G. Anderson
By C. T. Heinkel, ATTORNEY Patented Aug. 11, 1936

2,050,481

UNITED STATES PATENT OFFICE 2,050,481

LENGTH ADJUSTING MEANS FOR PLUNGERS AND THE LIKE

John Y. Blazek, Maple Heights, and Russell G. Anderson, Cleveland, Ohio, assignors to Lempco Products Inc., Bedford, Ohio Application March 13, 1933, Serial No. 660,516

4 Claims. (Cl. 121—38)

The present invention relates to adjustment between parts of a device such as a ram or plunger to vary the length thereof.

Objects of the present invention are:

To provide a device with means whereby a part thereof is quickly and conveniently adjusted axially relative to another part thereof as to length of the device.

To provide a device with means whereby axial adjustment of the length of a part thereof is easily, conveniently, quickly, and effectively retained.

To provide a device with means whereby a part thereof is easily, conveniently, quickly, and effectively released for length adjustment thereof by rotating the part a fraction of a revolution.

To provide a device with a length adjusting means whereby axial adjustment of a part thereof is attained easily, conveniently, quickly, and effectively by manipulation of the part itself.

To provide a device with a length adjusting means whereby axial adjustment of a part thereof is effectively attained and locked and released by successive rotative and axial movements of the part.

Other objects will be pointed out in this specification and will become obvious or apparent upon an inspection of this specification and of the accompanying drawings.

In many devices, for performing different diversified functions, it is quite desirable that axial adjustment of a part thereof, relative to one or more other parts thereof, be quickly, easily, conveniently, and effectively made. In the prior art, set screws, clamping means, screw thread engagement between parts and similar structures have been used to thread engagement between parts and similar structures have been used to adjust parts axially and to retain the same in adjusted position. However, as is well known in the art, such means wear out quickly, or upset, or otherwise become useless or at least inefficient especially in devices used in connection with percussion or similar operations.

The present invention aims to provide means whereby axial or length adjustment may be easily, conveniently, quickly, and effectively made and locked and released between parts of a device without the need of separately operating any auxiliary means nor of parts other than the part which is being adjusted.

The present invention is exemplified, in one embodiment thereof, in the accompanying drawings and specifically described in this specification. It is quite obvious, however, that the present invention can also be applied to various different kinds of devices wherein axial adjustment of one or more parts thereof may be of advantage or desirable or even necessary.

In the accompanying drawings, mentioned above:

Fig. 1 is a longitudinal section of a device embodying the present invention. Due to limitation by the size of the drawing paper, the device is shown somewhat shorter between the sleeve and the top of the plunger than it is usually made. The mechanism is shown as being in its innermost adjusted position.

Fig. 2 is a transverse section on line 2—2 of Fig. 1 showing the relation of the flange to the adjustable member.

Fig. 3 is a transverse section of the nut only; the section being taken on the line 3—3 of Fig. 1 and shows the interrupted thread therein more clearly.

Fig. 4 is a vertical section on a larger scale of a part of the adjusting member and the relation thereto of the flange and the nut.

Fig. 5 is a transverse section of the device showing the elements in on position.

Similar reference characters refer to similar parts throughout the views.

Figure 1:
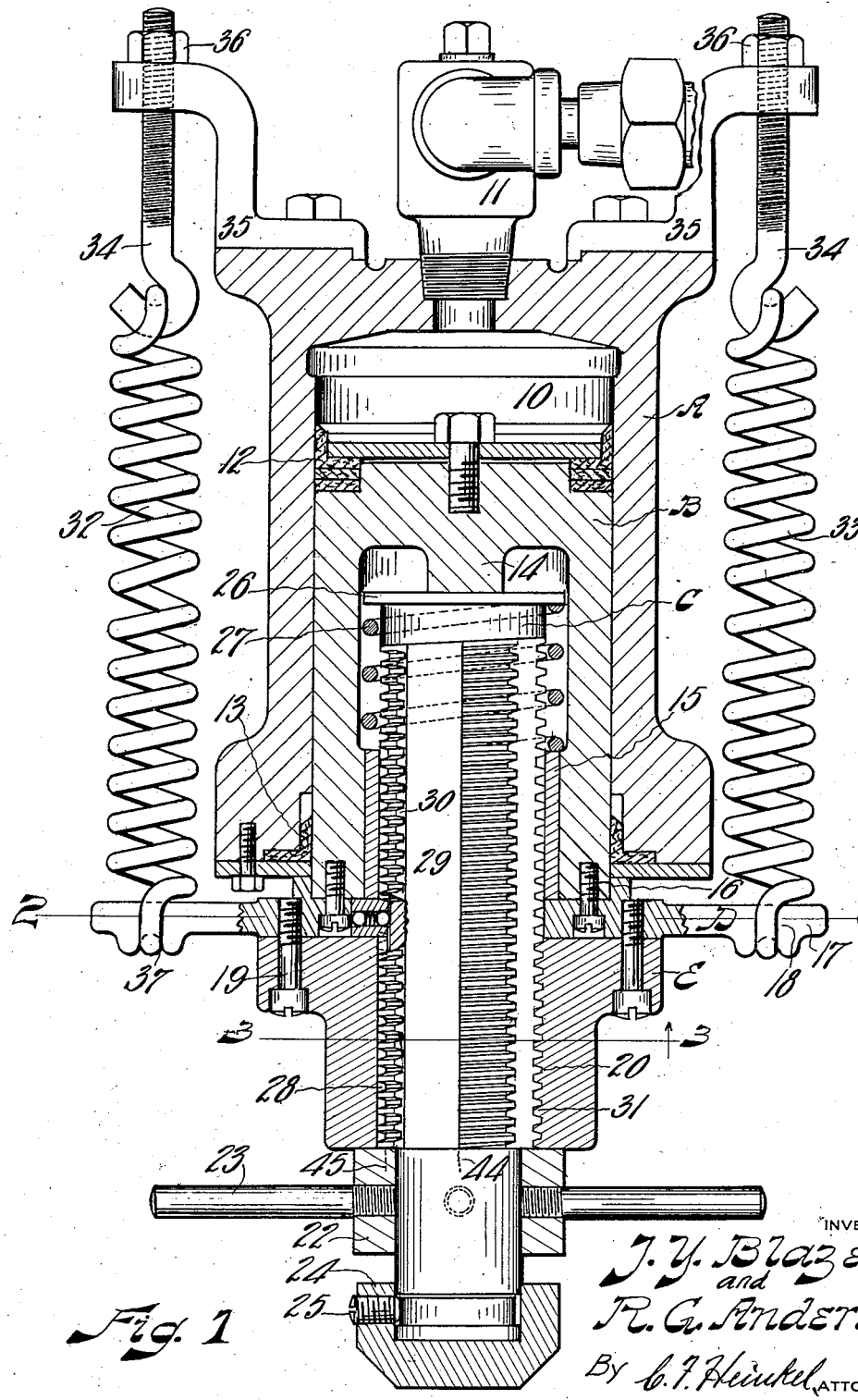

The device shown in the accompanying drawings is intended for general use as a percussion device such as are used for punching, riveting, or the like wherein axial adjustment of the tools used therein is desirable and this specification describes the structure so shown.

The cylinder A has the bore 10 therein, is open at the bottom end thereof, and closed at the top end. The inlet or outlet member 11 communicates with the interior of the cylinder and may be connected with any suitable control means for admission and exhaust of fluid pressure into and out of the cylinder.

The plunger B is axially movable in the bore 10 and has the sealing means 12 at the upper end thereof and the sealing means 13 at the bottom thereof for usual sealing purposes duplicated in this case so that the sealing means 13 may seal against whatever substance may escape the sealing means 12.

The boss 14 depends from the inside of the top wall of the plunger to form an abutment for the below described axially adjustable member C. The lower end of the plunger is open. The bushing 15 is pressed into the lower end of the plunger to form a bearing for the below described member C and the upper end of the bushing forms an abutment for the below described spring for the member C.

The flange or yoke D is centralized on the lower end of the plunger and is secured thereto by means of the screws 16 tapped into the end of the plunger. The arms 17 extend sidewise of the body part of the flange and each has the spring retaining groove 18 therein.

The adjusting member or nut E is secured to the underside of the flange D by means of the screws 19 threaded into the flange D.

The member or part E is internally threaded in the manner of a nut but the thread is interrupted as is more clearly shown in Fig. 3. In the present instance, the thread is formed as commonly called an acme thread but the present invention is not limited to any particular form of thread. It is preferred, however, that the top of the thread have flat surface 20 for purposes appearing presently. The interruption mentioned above comprises four groove-like cuts or keyways 21 traversing the thread for purposes appearing presently.

The member C extends into the plunger axially and part thereof extends outwardly of the plunger and of the cylinder. The outwardly extending end has the control collar 22 thereon and is held thereon by means of the control handles 23 threaded thereinto and abutting the member C for the purpose of holding the collar in a position on the member C, adjustably or otherwise, and to form an easy, convenient, and readily available means to impart rotative movement to the member C. The implement to be used by the device is represented by the element 24 on the extreme outer end of the member C and is held thereon by means of the set screw 25. The inner end of the member C has the abutment head 26.

One end of the spring 27 abuts the under side of the head 26 and the other end abuts the inner end of the bushing 15 and is normally under compression to always retain the member C in innermost position thereof according to axial adjustment thereof.

A part of the member C has the external thread 28 corresponding to the internal thread in the member E and this thread is also interrupted by means of the grooves or keyways 29 and leaving the threaded parts 30 to engage the threaded parts 31 of the member E when the device is in operative condition with the member C in adjusted position therein. The top of the thread on the member C is also flat for better wearing and guiding surface of the member C in the bushing and fits closely to the bore of the bushing. The upper part of the member C is shown as not being in contact with the bore in the plunger. However, the head 26 on the upper end thereof may be made large enough diametrically to fit the bore in the plunger more or less closely to guide the upper end of the member C also when it is desired to prevent wabbling of the member C in the device beyond whatever wabbling may be taken care of by the fit of the top of the thread of the member C in the bushing 15.

The grooves 21 in the nut are a little wider than the width of the threaded parts 31 so that the member C can move axially in the nut E when the threaded parts 30 and 31 are out of engagement with each other.

The plunger B, the flange D, the nut E, and the member C are normally held together as one unit and normally abut the open end of the cylinder. The springs 32 and 33 normally tend to retain the mentioned unit against the open end of the cylinder.

Each of the springs 32 or 33 has the hook bolt 34 on one end thereof which has a threaded stem extending through the bracket 35 on the cylinder and the nut 36 threaded onto the stem and abutting the upper surface of the bracket for tensional adjustment of the spring. The other end of the springs is hooked onto the corresponding arm 17 of the flange D and confined in proper position thereon by the loop end 37 being engaged in the spring retaining groove 18.

The locking means for the member C comprises the slot 38 through the flange D and the locking block 39 in the slot. The locking block has a hole 40 through the same, a ball 41 in each end of the hole, and the spring 42 in the hole and between the balls 41.

One of the grooves 29 of the member C has the groove like depression 43 in the bottom and extending longitudinally thereof located so that the inner ball 41 may engage therein and define or make known by feeling when the thread in the nut E is in engagement with the thread on the member C and also held the member C releasably against self rotation.

The line 44 may be provided for more ease and convenience in knowing and showing when the threads are in engagement and the line 45 may be provided to show when the member C is in rotative position to permit axial adjustment thereof.

Axial adjustment of the member C may be attained by taking hold of the control handles 23 and giving the member C a rotative movement relative to the device. The line 44 shows when the threads of the nut and of the member C are in full length engagement while the line 45 shows when the threads are out of engagement so that this rotative movement would begin at the line 44 and should be continued until the line 45 is reached by the line 44 which then indicates clearly that the threads are released from each other and that the member C can be moved axially on the device. The spring 27 retains the member C against downward movement outwardly of the device.

A downwardly or outwardly movement of the device on the member C will move the same outwardly of the device for axial adjustment thereof relative to the device and this outward movement can be continued as far as desired since the thread part of the member C is now located in the groove 21 and can move therein axially and be stopped at any desired point or relation of the implement 24 to the device or to an article it is to operate on. When that point or position is reached, a one-eighth rotative movement of the member C moves the thread of the member C into engagement with the thread in the nut E and the device is again ready for use without any tightening of screws or, in fact, any auxiliary operation of any kind.

Axial adjustment as well as locking of the adjustment is attained while the adjustment itself is being made and is attained by and during the adjusting operation and without manipulating any part of the device except the member which is being adjusted.

When a power means is applied to the top of the plunger, the springs 32 and 33 will be extended as the plunger moves downwardly in the cylinder and will retract as soon as the pressure is released on the top of the plunger and thereby will move the member C and associated structure back to the original adjusted position thereof.

In the device shown and described, the member C can be adjusted relative to the device or to an article or destination outwardly of the device so that the member C can retract to a desired distance inwardly of the device or to extend to a desired distance outwardly of the device; adjustment is attained by doing nothing more than releasing the member C by a rotative movement thereof, then moving the member C axially to a desired position or adjustment and then locking the member C in adjusted position by a rotative movement of the member C.

We are aware that our invention is applicable to environments and uses other than the one application and use shown and described herein for illustration purposes. We are also aware that changes and modifications in structure and in arrangement can be made within the spirit and intent of the present invention and of the appended claims. Therefore, we do not limit ourselves to the precise application of our invention nor to the specific structure and arrangement thereof as shown and described herein.

We claim:

1. In a locking means, a support, an axially adjustable and lockable member extending into said support and having a groove therein, longitudinally thereof, a yoke telescoped over said member and unrotatably secured to said support and having a recess therein adjacent to said member, a block in said recess and having a hole radially therethrough, a spring in said hole, and a ball at each end of said spring, one of said balls engaging said yoke, and the other engaging said member and said groove therein upon a rotative movement of said member to releasably lock the same against rotative movement.

2. In a locking means, a support, an axially adjustable and lockable member extending into said support and having a groove therein longitudinally thereof, a yoke having a bore therein and being telescoped over said member and unrotatably secured to said support and having a recess therein extending inwardly of the bore, a block in said recess and having a hole radially through the same, a spring in said hole, a ball at each end of said spring, one of said balls engaging the bottom of said recess, and the other one engaging said member and engaging said groove for retaining said member against self rotation subsequent to a rotative locking movement imparted thereto.

3. A structure for a press having, a member axially movable for operating on work and axially adjustable for relation to the work, a self locking and self releasing locking means for said member to retain the same against and to permit axial movement thereof for axial adjustment thereof and operated upon a rotative movement thereof, and automatically operating means for retaining said member against self rotative movement and automatically released upon corresponding rotative movements exerted on said member and including an individual, circularly movable, rectangular locking block movable in limitation between said member and the structure.

4. A machine part having a bore, an axially adjustable member extending axially into said bore and being journaled therein and having an end thereof adapted to operate directly axially on work, said part having internal teeth, means between said member and said part to allow unrotative axial movement of said member relative to said part, external teeth on said member corresponding to said internal teeth in said part to engage each other upon a rotative movement of said member relative to said part to retain an axial relationship between said member and said part upon engagement of said teeth, means for rotatively moving said member relative to said part to disengage said teeth for axial movement of said member, and a locking and releasing means including an individual, circularly movable, radially confined, rectangular locking block normally retaining said member against self rotation thereof in said part and being self releasing and self locking, respectively, at the beginning and at the end of a full teeth engaging movement of said member.

JOHN Y. BLAZEK.
RUSSELL G. ANDERSON.